(12) United States Patent
Washizuka

(10) Patent No.: US 12,562,292 B2
(45) Date of Patent: Feb. 24, 2026

(54) CONDUCTIVE PASTE AND GLASS ARTICLE

(71) Applicant: Murata Manufacturing Co., Ltd., Nagaokakyo (JP)

(72) Inventor: Seitaro Washizuka, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 0 days.

(21) Appl. No.: 18/520,724

(22) Filed: Nov. 28, 2023

(65) Prior Publication Data

US 2024/0096518 A1 Mar. 21, 2024

Related U.S. Application Data

(63) Continuation of application No. PCT/JP2022/020836, filed on May 19, 2022.

(30) Foreign Application Priority Data

Jun. 1, 2021 (JP) ................................. 2021-092266

(51) Int. Cl.
*H01B 1/22* (2006.01)
*B60S 1/02* (2006.01)

(52) U.S. Cl.
CPC ............... *H01B 1/22* (2013.01); *B60S 1/026* (2013.01)

(58) Field of Classification Search
CPC ................................. H01B 1/22; B60S 1/026
See application file for complete search history.

(56) References Cited

U.S. PATENT DOCUMENTS

| | | | | |
|---|---|---|---|---|
| 5,378,408 | A | * | 1/1995 | Carroll ..................... H01B 1/16 |
| | | | | 252/514 |
| 7,727,424 | B2 | * | 6/2010 | Konno ..................... H01B 1/22 |
| | | | | 252/514 |
| 7,851,012 | B2 | | 12/2010 | Konno |
| 9,224,885 | B2 | * | 12/2015 | Akimoto ................. H01L 31/18 |
| 9,246,030 | B2 | * | 1/2016 | Laughlin .......... H01L 31/02245 |
| 10,029,542 | B2 | | 7/2018 | Tsugimoto |
| 2001/0010617 | A1 | * | 8/2001 | Miyazaki .............. H01F 41/046 |
| | | | | 156/89.12 |
| 2003/0201426 | A1 | | 10/2003 | Adachi |
| 2004/0155227 | A1 | | 8/2004 | Bechtloff et al. |
| 2007/0187652 | A1 | * | 8/2007 | Konno ............ H01L 31/022425 |
| | | | | 252/500 |
| 2010/0175754 | A1 | | 7/2010 | Konno |

(Continued)

FOREIGN PATENT DOCUMENTS

| | | |
|---|---|---|
| JP | H0785720 A | 3/1995 |
| JP | 2003323815 A | 11/2003 |

(Continued)

OTHER PUBLICATIONS

International Search Report in PCT/JP2022/020836, mailed Aug. 2, 2022, 2 pages.

*Primary Examiner* — Mark Kopec
*Assistant Examiner* — Jaison P Thomas
(74) *Attorney, Agent, or Firm* — ArentFox Schiff LLP

(57) ABSTRACT

A conductive paste containing: a conductive powder; a glass frit; an organic vehicle; and a silicon resonate sintering retardant, and a content of the silicon resinate sintering retardant is 0.005 wt % or more in terms of metal based on 100 wt % of the conductive powder.

8 Claims, 1 Drawing Sheet

(56)                    References Cited

U.S. PATENT DOCUMENTS

| | | | |
|---|---|---|---|
| 2013/0014817 A1* | 1/2013 | Konno | H01L 31/022425 |
| | | | 257/E31.124 |
| 2013/0186463 A1* | 7/2013 | Wang | C03C 8/20 |
| | | | 252/514 |
| 2017/0210207 A1 | 7/2017 | Tsugimoto | |
| 2022/0062988 A1 | 3/2022 | Furusawa | |

FOREIGN PATENT DOCUMENTS

| | | | | |
|---|---|---|---|---|
| JP | 2004525490 A | 8/2004 | | |
| JP | 2007-194580 A | 8/2007 | | |
| JP | 2009187695 A | 8/2009 | | |
| JP | 2015-193253 A | 11/2015 | | |
| WO | 2016/072204 A1 | 5/2016 | | |
| WO | 2017/006714 A1 | 1/2017 | | |
| WO | WO-2019073637 A1 * | 4/2019 | | H01B 5/14 |
| WO | 2020144931 A1 | 7/2020 | | |

* cited by examiner

CONDUCTIVE PASTE AND GLASS ARTICLE

CROSS REFERENCE TO RELATED APPLICATIONS

The present application is a continuation of International application No. PCT/JP2022/020836, filed May 19, 2022, which claims priority to Japanese Patent Application No. 2021-092266, filed Jun. 1, 2021, the entire contents of each of which are incorporated herein by reference.

TECHNICAL FIELD

The present invention relates to a conductive paste and a glass article, and more particularly to a conductive paste for forming anti-fogging hot wires, an antenna pattern, or the like provided on window glass for a vehicle such as an automobile, and to a glass article using the conductive paste, such as anti-fogging glass or a glass antenna.

BACKGROUND ART

Glass articles, such as anti-fogging glass equipped with anti-fogging hot wires and glass with an antenna for receiving radio waves from outside a vehicle, are conventionally used as window glass for a vehicle such as an automobile. For these glass articles, for example, anti-fogging glass, it is common practice to apply a conductive paste in lines onto a glass substrate as a base, and fire the conductive paste to form a conductive film in a predetermined pattern. Various types of such conductive pastes have been developed and proposed.

For example, Patent Document 1 discloses a conductive paste containing a glass frit, a paste-forming medium, conductive particles made of silver, and particles containing non-precious metal to produce a conductive coating on glass, ceramic, or enameled steel, a method for producing the coating, and an article coated therewith. The conductive paste disclosed in Patent Document 1 relates to the field of conductive coatings, baked on substrates, for conductor tracks provided on window glass or ceramic substrates for electrical and electronic purposes.

In the conductive paste disclosed in Patent Document 1, the conductive particles containing non-precious metal correspond to up to 80 wt % of all conductive particles, and are essentially made up of iron, cobalt, nickel, copper, zinc, or an alloy containing at least one of these elements, especially nickel, and have an average particle size $d_{50}$ ranging from 0.1 to 15 μm and a specific surface area ranging from 0.5 to 10 m²/g. The glass frit begins to soften at 350° C. to 600° C. and has a hemisphere temperature of 450° C. to 700° C. The document states that the resistivity of a conductive coating on glass obtained by using such a conductive paste, which has been baked using fast firing at a temperature within the range from 660° C. to 680° C., should vary by less than 10%, preferably less than 5%.

Patent Document 1: Japanese Unexamined Patent Application Publication (Translation of PCT Application) No. 2004-525490

SUMMARY OF INVENTION

However, a conductive paste such as that proposed in Patent Document 1, when it is placed on an amorphous ceramic layer and an electrode is formed from the paste, has the problem of the occurrence of sintering shrinkage of silver, causing the formation of cracks in the ceramic layer.

For a conductive paste for use in the formation of anti-fogging hot wires or an antenna pattern provided on window glass for a vehicle such as an automobile, it is also desirable to inhibit the formation of cracks in a ceramic layer to which the conductive paste has been applied, and to reduce a decrease in the resistivity of a conductive pattern even when it is thin.

Therefore, a main object of the present invention relates to a conductive paste which can inhibit sintering shrinkage even when it is applied to a ceramic layer and sintered and which can reduce a decrease in resistivity after sintering, and to a glass article using the conductive paste.

A conductive paste according to an aspect of the present invention contains: a conductive powder; a glass frit; an organic vehicle; and a silicon resonate sintering retardant, wherein a content of the silicon resinate sintering retardant is 0.005 wt % or more in terms of metal based on 100 wt % of the conductive powder.

The conductive paste according to an aspect of the present invention contains a predetermined amount of the silicon resinate as a sintering retardant. The silicon component is adsorbed onto the conductive powder and inhibits sintering of the conductive powder. The adsorbed silicon component produces silicon oxide as firing progresses. Further, as the firing progresses, the glass frit contained in the conductive paste melts and flows, and the silicon oxide is dissolved in the melt, whereby sintering of the conductive powder progresses. It thus becomes possible to delay the timing of sintering of the conductive powder.

Though the conductive paste of the present invention contains a predetermined amount of silicon resinate as a sintering retardant, once the silicon oxide produced is dissolved in the glass frit, sintering of the conductive powder is not inhibited any more. With the progress of sintering, the density of a conductive film formed from the conductive paste increases; accordingly, the resistivity of the conductive film can be sufficiently reduced.

A glass article according to an aspect of the present invention is a glass article including a glass substrate; a ceramic layer on a surface of the glass substrate; and a conductor circuit including a conductive film on a surface of the ceramic layer. The conductive film is a fired product of the conductive paste described herein.

In the glass article according to an aspect of the present invention, due to the retardation of sintering of the conductive powder contained in the conductive paste used for the formation of a conductive film, the glass frit can sufficiently flow to the underlying ceramic layer and increase the strength of binding to the ceramic layer before the conductive powder sinters and shrinks. This enables the ceramic layer to withstand the stress caused by sintering shrinkage of the conductive powder, thereby inhibiting the formation of cracks in the ceramic layer.

According to the present invention, it is possible to provide a conductive paste which can inhibit sintering shrinkage even when it is applied to a ceramic layer and sintered and which can reduce a decrease in resistivity after sintering, and to provide a glass article using the conductive paste.

These and other objects, features, and advantages of the present invention will become more apparent from the description of embodiments given below with reference to the drawings.

DETAILED DESCRIPTION OF THE PREFERRED EMBODIMENTS

Embodiments of the present invention will now be described in detail.

Figure 1:
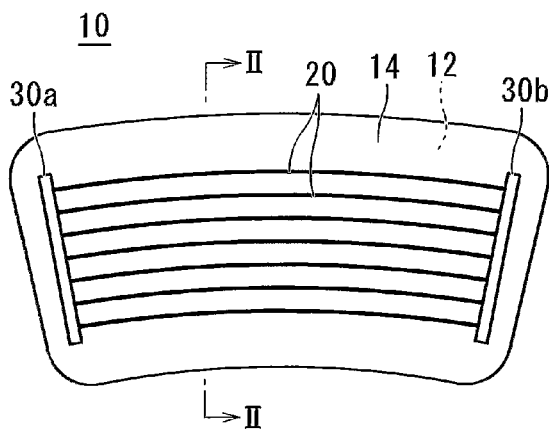
FIG. 1 is a front view showing an embodiment of anti-fogging glass as a glass article produced using a conductive paste according to the present invention.
Figure 2:
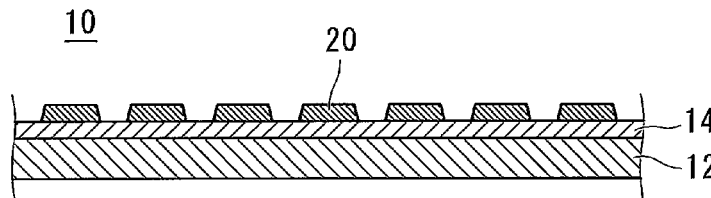
FIG. 2 is a cross-sectional view taken along line II-II in FIG. 1.

FIG. 1 is a front view showing an embodiment of anti-fogging glass as a glass article produced using a conductive paste according to an aspect of the present invention, and FIG. 2 is a cross-sectional view taken along line II-II in FIG. 1.

1. Anti-Fogging Glass

As shown in FIGS. 1 and 2, the anti-fogging glass 10 includes a glass substrate 12, a ceramic layer 14 formed on one surface of the glass substrate 12, and conductive films 20 formed in a predetermined pattern on the surface of the ceramic layer 14. The conductive films 20 each have a narrow and thin linear shape, and are arranged in parallel on the surface of the ceramic layer 14 at predetermined intervals. Busbar electrodes 30a and 30b are formed at both ends of the conductive films 20, and are connected to power supply terminals (not shown) via solder. The anti-fogging glass 10 thus includes a conductor circuit composed of the conductive films 20 and the busbar electrodes 30a and 30b formed on the surface of the ceramic layer 14.

2. Method for Producing Anti-Fogging Glass

The anti-fogging glass 10 can be produced in the following manner.

First, a ceramic paste containing a ceramic powder, comprising a glass frit, and an organic vehicle is produced.

There is no particular limitation on the ceramic powder comprising a glass frit; it may be appropriately selected according to need from among ZnO, $Al_2O_3$, $B_2O_3$, $SiO_2$, $TiO_2$, $ZrO_2$, alkali metal oxides, alkaline earth metal oxides, etc., which can be mixed and used in a predetermined composition.

The glass frit is preferably amorphous. An amorphous glass frit easily softens upon firing and exhibits high fluidity, and therefore can be fired at a relatively low temperature.

The anti-fogging glass 10 is usually installed in the rear of a vehicle or the like. Therefore, it is preferred to add a black pigment having an anti-glare effect to the ceramic paste.

Organic vehicles similar to those described below for the conductive paste of the present invention can be used as the above organic vehicle.

The ceramic powder comprising a glass frit and the organic vehicle are weighed and mixed at a predetermined mixing ratio, and dispersed and kneaded using a three-roll mill or the like to produce a ceramic paste.

Next, the ceramic paste is applied onto the glass substrate 12, followed by drying to produce a dry ceramic film.

Next, the below-described conductive paste of the present invention is applied in lines onto the dry ceramic film and dried. Thereafter, the dry ceramic film is subjected to firing to form the ceramic layer 14, with the conductive films 20 formed in a predetermined pattern on the surface of the ceramic layer 14. The conductive films 20 are thus fixed onto the ceramic layer 14.

Thereafter, the busbar electrodes 30a and 30b are electrically connected to both ends of the conductive films 20, and the busbar electrodes 30a and 30b are soldered to power supply terminals (not shown). The anti-fogging glass 10 of this embodiment is thus produced.

The anti-fogging glass thus produced is used, for example, as a front windshield or a rear windshield of a vehicle such as an automobile. Power is supplied to the conductive films 20 from the power supply terminals via the busbar electrodes 30a and 30b to generate heat so that the anti-fogging glass can function to inhibit fogging of such a vehicle window or function as an antenna. Further, if the ceramic layer 14 is colored black, the anti-fogging glass has an anti-glare function.

3. Conductive Paste

The conductive paste for forming the above-described conductive films 20 will now be described in detail.

The conductive paste according to an aspect of the present invention contains a conductive powder, a glass frit, an organic vehicle, and a sintering retardant.

A preferred conductive powder that can be used for the conductive paste is a metal powder having good electrical conductivity, such as silver (Ag), a Ag alloy, palladium (Pd), a silver-palladium alloy, copper (Cu), or a Cu alloy. Among them, a Ag powder is particularly preferred because it can maintain its good electrical conductivity without being oxidized even when it is subjected to firing in air. The conductive paste may contain a Ag powder in an amount of 80 wt % or more, and may also contain various metal powders, such as Pd, Pt, Cu, and Ni, as additives.

While there is no particular limitation on the content of the conductive powder in the conductive paste, it is preferably to 50.0 wt % to 95.0 wt %. If the content of the conductive powder is less than 50.0 wt %, the content of the organic vehicle is relatively high. This may cause thinning of the conductive films 20, resulting in an increase in electrical resistance. Further, dissolution of the conductive films 20 in solder is likely to occur during soldering, which may cause a decrease in the strength of binding to power supply terminals. On the other hand, if the content of the conductive powder exceeds 95.0 wt %, the amount of the conductive powder may be excessive, making it difficult to form a paste. Thus, in view of the formation of a conductive paste, and also of a low line resistance, the content of the conductive powder is preferably 50.0 wt % to 95.0 wt %.

There is no particular limitation on the shape of the conductive powder; for example, it may be spherical, flat, or irregular, or a mixture thereof.

There is no particular limitation on the average particle size $D_{50}$ of the conductive powder; however, it is preferably 0.05 μm to 10 μm in terms of spherical powder from the viewpoint of achieving a desired low line resistance. If the average particle size $D_{50}$ of the conductive powder is less than 0.05 μm, it is difficult to form a paste. On the other hand, if the average particle size $D_{50}$ of the conductive powder exceeds 10 μm, the electrical resistance tends to be high.

The conductive paste contains a glass frit in order to bind the conductive films 20 to the ceramic layer 14.

There is no particular limitation on the glass material used for the glass frit; however, it preferably contains B and/or Bi from the viewpoint of promoting adsorption of a particular metal element to the glass frit. For example, it is preferred to use a glass frit such as a Bi—B—Si—O-based or Bi—B—Al—Si—O-based glass frit.

The glass frit needs to be melted and fluidized at the firing temperature in order to avoid a decrease in sintered density and insufficient sealing at the interface with the conductive films 20. Glass articles such as the anti-fogging glass 10 are usually fired at a temperature of about 500° C. to 800° C. Therefore, it is preferred to use a glass frit whose composition has been adjusted so that the glass frit has a softening point of about 350° C. to 600° C. "Softening point" herein refers to the softening point determined by the fiber elongation method of ASTM C338-57.

The above-described glass frit such as a Bi—B—Si—O-based or Bi—B—Al—Si—O-based glass frit may contain oxides of various elements such as Zn, Ti, Zr, Cu, Fe, Sb, P, Te, Mg, Ca, Sr, Ba, Li, Na, K, and F as necessary.

While there is no particular limitation on the average particle size $D_{50}$ (median size) of the glass frit, it is preferably 0.1 μm to 5.0 μm from the viewpoint of the adhesion between the ceramic layer 14 and the conductive films 20 and the viewpoint of the sinterability of the conductive paste.

The organic vehicle is prepared such that the volume ratio between a binder resin and an organic solvent is, for example, 1-3:7-9. There is no particular limitation on the binder resin; for example, it is possible to use an ethyl cellulose resin, a nitrocellulose resin, an acrylic resin, an alkyd resin, a butyral resin, a polyvinyl alcohol resin, a polyester resin, an epoxy resin, a urethane resin, a vinyl resin, an amide resin, a phenolic resin, or a combination thereof. There is no particular limitation on the organic solvent. Examples of the organic solvent include α-terpineol, dihydroterpineol, hydrogenated terpineol acetate, texanol, diethylene glycol monobutyl ether, diethylene glycol monobutyl ether acetate, diethylene glycol monoethyl ether, diethylene glycol monoethyl ether acetate, diethylene glycol monohexyl ether, diethylene glycol monobenzyl ether, diethylene glycol dibutyl ether, triethylene glycol monomethyl ether, triethylene glycol monobutyl ether, triethylene glycol dimethyl ether, ethylene glycol monoethyl ether, ethylene glycol monobutyl ether, ethylene glycol monohexyl ether, and ethylene glycol monobenzyl ether. These solvents can be used singly or in combination.

A silicon resinate is used as the sintering retardant. The content of the silicon resinate is 0.005 wt % to 0.5 wt %, based on 100 wt % of the conductive powder. When the content of the silicon resinate is within this range, it is possible to inhibit the formation of cracks in the ceramic layer 14 and to reduce the resistivity. More preferably, the content of the silicon resinate is 0.02 wt % to 0.2 wt %. When the content of the silicon resinate is within this range, it is possible to further reduce the resistivity while further inhibiting the formation of cracks in the ceramic layer 14.

In addition to the above-described conductive powder, glass frit, organic vehicle, and sintering retardant, the conductive paste may contain, as necessary, an additive containing a particular metal element for adjusting the characteristics of the electrode. Further, the conductive paste may contain various additives for adjusting its properties, such as a dispersant, a plasticizer, an anti-settling agent, and a thixotropic agent. The content of such an additive, whose composition is not particularly limited, is preferably 5 wt % or less based on the total amount of the paste.

The conductive paste can be easily produced by weighing and mixing the conductive powder, the glass frit, such as a B—Bi—Si—O-based glass frit, the organic vehicle, and the sintering retardant at a predetermined mixing ratio, and dispersing and kneading the mixture using a three-roll mill or the like.

In the case of a conductive paste containing no silicon resinate, the glass frit melts after the start of sintering of Ag particles as a conductive powder. Therefore, the sintering shrinkage of the Ag particles progresses before the glass frit binds the Ag particles to the underlying ceramic layer, resulting in the formation of cracks in the ceramic layer.

On the other hand, the conductive paste according to the present invention contains a predetermined amount of silicon resinate as a sintering retardant. The silicon component is adsorbed onto Ag particles and inhibits sintering of the Ag particles. The adsorbed silicon component produces silicon oxide as firing progresses. Further, as the firing progresses, the glass frit contained in the conductive paste melts and flows, and the silicon oxide is dissolved in the melt, whereby sintering of the Ag particles progresses. It thus becomes possible to delay the timing of sintering of the Ag particles.

Thus, due to the retardation of sintering of the Ag particles, the glass frit can sufficiently flow to the underlying ceramic layer 14 and increase the strength of binding to the ceramic layer 14 before the Ag particles sinter and shrink. This enables the ceramic layer 14 to withstand the stress caused by sintering shrinkage of the Ag particles, thereby inhibiting the formation of cracks in the ceramic layer 14.

Though the conductive paste according to aspects of the present invention contains a predetermined amount of silicon resinate as a sintering retardant, once the silicon oxide produced is dissolved in the glass frit, sintering of the Ag particles is not inhibited any more. With the progress of sintering, the density of the conductive films 20 formed from the conductive paste increases; accordingly, the resistivity of the conductive films 20 can be sufficiently reduced.

While the above-described embodiment illustrates the anti-fogging glass 10 as a glass article, the conductive paste described herein can be widely used for various glass articles other than the anti-fogging glass 10, including glass articles which are required to have sulfidation resistance, such as a glass antenna.

4. Experimental Examples

The following experimental examples illustrate aspects of the present invention in greater detail.

A. Production of Samples

A Ag powder was prepared as a conductive metal. The average particle size of the Ag powder was 1 μm.

A Bi—B—Si—O-based glass frit was prepared as a glass frit. The average particle size of the Bi—B—Si—O-based glass frit was 2 μm.

An organic vehicle was prepared. In particular, 10 wt % of an ethyl cellulose resin as a binder resin and 90 wt % of texanol as an organic solvent were mixed to prepare an organic vehicle.

Samples containing a silicon resinate (Si resinate) as a resinate species further added as a sintering retardant were prepared, and samples containing a Rh resinate, a Ni resinate, or a Cu resinate as a resinate species further added as a sintering retardant were also prepared.

The conductive paste sample of Sample No. 1 was produced as follows. A composition consisting of 80 wt % of the Ag powder, 4 wt % of the glass frit, and 16 wt % of the organic vehicle was mixed in a planetary mixer, and the resulting mixture was dispersed and kneaded using a three-roll mill to produce the conductive paste sample.

The conductive paste samples of Sample Nos. 2 to 9 were produced as follows. A composition consisting of 80 wt % of the Ag powder, 4 wt % of the glass frit, a silicon resinate having an Si content of 10% in varying amounts in the range of 0.001 to 0.5 parts by weight in terms of the Si component based on 100 parts by weight of Ag, and the remainder being the organic vehicle was prepared. The composition was mixed in a planetary mixer, and the resulting mixture was dispersed and kneaded using a three-roll mill to produce each of the conductive paste samples.

The conductive paste sample of Sample No. 10 was produced as follows. A composition consisting of 80 wt % of the Ag powder, 4 wt % of the glass frit, a Rh resinate having a Rh content of 5% in an amount of 0.1 parts by weight in terms of the Rh component based on 100 parts by weight of Ag, and the remainder being the organic vehicle was prepared. The composition was mixed in a planetary mixer, and the resulting mixture was dispersed and kneaded using a three-roll mill to produce the conductive paste sample.

The conductive paste sample of Sample No. 11 was produced as follows. A composition consisting of 80 wt % of the Ag powder, 4 wt % of the glass frit, a Ni resinate having a Ni content of 10% in an amount of 0.1 parts by weight in terms of the Ni component based on 100 parts by weight of Ag, and the remainder being the organic vehicle was prepared. The composition was mixed in a planetary mixer, and the resulting mixture was dispersed and kneaded using a three-roll mill to produce the conductive paste sample.

The conductive paste sample of Sample No. 12 was produced as follows. A composition consisting of 80 wt % of the Ag powder, 4 wt % of the glass frit, a Cu resinate having a Cu content of 8% in an amount of 0.1 parts by weight in terms of the Cu component based on 100 parts by weight of Ag, and the remainder being the organic vehicle was prepared. The composition was mixed in a planetary mixer, and the resulting mixture was dispersed and kneaded using a three-roll mill to produce the conductive paste sample.

B. Evaluation of Samples (a) Evaluation of Resistivity

A soda lime slide glass having a length of 76.0 mm, a width of 26.0 mm, and a thickness of 1.4 mm was prepared. Using each of the conductive paste samples of Sample Nos. 1 to 12, a conductive pattern having a length L of 100 mm and a width W of 0.5 mm was formed by printing on the slide glass. Subsequently, the slide glass was dried at a temperature of 150° C. for 10 minutes, and then fired at a maximum firing temperature of 600° C. for about 5 minutes to produce each of samples of Sample Nos. 1 to 12 having the conductive film thus formed.

The line resistance value R (Ω) of the conductive film was measured with a micro-ohmmeter (manufactured by Agilent Technologies, model number: 34420A). Further, the cross-sectional area A ($\mu m^2$) of the conductive film was measured with a surface roughness meter (manufactured by Tokyo Seimitsu Co., Ltd., model number: Surfcom 1400D). The resistivity of the conductive film was calculated by the following equation using the line length L (mm).

$$\text{Resistivity}(\mu\Omega\cdot cm)=R\times A/L/10$$

The resistivity of the conductive film was rated "©" when it was less than 2.8 μΩ·cm, rated "O" when it was not less than 2.8 μΩ·cm and less than 3.0 μΩ·cm, rated "Δ" when it was not less than 3.0 μΩ·cm and less than 3.5 μΩ·cm, and rated "X" when it was more than 3.5 μΩ·cm.

(b) Evaluation of Cracks

A soda lime slide glass having a length of 76.0 mm, a width of 26.0 mm, and a thickness of 1.4 mm and a black ceramic paste were prepared. The black ceramic paste was applied to the slide glass by screen printing, and dried at a temperature of 150° C. for 10 minutes to produce a dry ceramic film (ceramic layer).

Next, using each of the conductive paste samples of Sample Nos. 1 to 12, a conductive pattern having a line length L of 100 mm and a width W of 0.5 mm was formed by printing on the black ceramic layer. Subsequently, the slide glass was dried at a temperature of 150° C. for 10 minutes, and then fired at a maximum firing temperature of 650° C. for about 5 minutes to produce each of samples of Sample Nos. 1 to 12 having the conductive film thus formed.

A peripheral portion of the conductive film on the black ceramic layer was observed by a microscope to check the presence or absence of cracks in the black ceramic layer. The checking of the presence or absence of cracks was performed by irradiating the conductive film with light traveling in a direction from the Ag electrode side to the glass substrate side and observing the transmitted light.

Cracking was rated "⊚" when no crack was observed, rated "O" when a slight crack(s) was observed, and rated "X" when cracks were observed.

Table 1 shows the resinate species, the amounts of the resinates, the resistivities, the presence/absence of cracks, and the overall ratings for Sample Nos. 1 to 12.

TABLE 1

| Sample No. | Resinate species | Amount (wt %) | Resistivity (μΩ · cm) | Rating for resistivity | Presence/ absence of cracks | Overall rating |
|---|---|---|---|---|---|---|
| 1 | None | — | 2.7 | ⊚ | X | X |
| 2 | Si resinate | 0.001 | 2.7 | ⊚ | X | X |
| 3 | Si resinate | 0.005 | 2.7 | ⊚ | O | O |
| 4 | Si resinate | 0.010 | 2.7 | ⊚ | O | O |
| 5 | Si resinate | 0.020 | 2.7 | ⊚ | ⊚ | ⊚ |
| 6 | Si resinate | 0.050 | 2.7 | ⊚ | ⊚ | ⊚ |
| 7 | Si resinate | 0.100 | 2.7 | ⊚ | ⊚ | ⊚ |
| 8 | Si resinate | 0.200 | 2.8 | O | ⊚ | ⊚ |
| 9 | Si resinate | 0.500 | 3.0 | Δ | ⊚ | O |
| 10 | Rh resinate | 0.100 | 3.8 | X | ⊚ | X |
| 11 | Ni resinate | 0.100 | 3.5 | X | X | X |
| 12 | Cu resinate | 0.100 | 3.1 | Δ | X | X |

C. Experimental Results

The sample of Sample No. 1 had good resistivity. However, because of the absence of a silicon resinate as a sintering retardant, cracks were formed in the black ceramic layer.

The sample of Sample No. 2 had the same good resistivity as the sample of Sample No. 1. However, since the amount of the silicon resinate as a sintering retardant was as small as 0.001 wt %, retardation of sintering did not occur, resulting in the formation of cracks in the black ceramic layer.

The sample of Sample No. 3, because of the addition of the silicon resinate as a sintering retardant in an amount of 0.005 wt %, exhibited a reduction in the formation of cracks in the black ceramic layer. The sample of Sample No. 3 had the same resistivity as the sample of Sample No. 1, to which no sintering retardant was added. This may be attributable to the fact that the addition of the silicon resinate as a sintering retardant in an amount of 0.005 wt % caused retardation of sintering of Ag.

The sample of Sample No. 4, because of the addition of the silicon resinate as a sintering retardant in an amount of 0.010 wt %, exhibited a reduction in the formation of cracks in the black ceramic layer. The sample of Sample No. 4 had the same resistivity as the sample of Sample No. 1, to which no sintering retardant was added. This may be attributable to the fact that the addition of the silicon resinate as a sintering retardant in an amount of 0.010 wt % caused retardation of sintering of Ag.

The samples of Sample Nos. 5 to 9, to which the silicon resinate as a sintering retardant was added in an amount in the range of 0.02 to 0.5 wt %, exhibited a further reduction in the formation of cracks in the black ceramic layer.

The samples of Sample Nos. 5 to 7, to which the silicon resinate as a sintering retardant was added in an amount in the range of 0.02 to 0.1 wt %, had the same resistivity as the sample of Sample No. 1, to which no sintering retardant was added.

On the other hand, the samples of Sample Nos. 8 and 9, to which the silicon resinate as a sintering retardant was added in amounts of 0.2 wt % and 0.5 wt %, respectively, tended to have a slightly higher resistivity. This may be attributable to the fact that the addition of a larger amount of the silicon resinate produced a greater effect of retarding sintering of Ag. It is conceivable that the addition of the silicon resinate as a sintering retardant in an amount of not less than 0.2 wt % will increase the amount of Si oxide, which is an insulator, resulting in a decrease in the electrical conductivity of the conductive film.

The sample of Sample No. 10, to which the Rh resinate was added, exhibited a reduction in the formation of cracks in the black ceramic layer. However, it was found that the sample had a significantly increased resistivity. It is conceivable in this regard that the Rh resinate inhibited sintering of Ag and reduced shrinkage of Ag associated with sintering, resulting in reduced stress applied to the underlying black ceramic layer and thus a reduction in the formation of cracks. On the other hand, it was found that the inhibition of sintering of Ag caused a decrease in film density and thus a decrease in electrical conductivity.

In the sample of Sample No. 11, to which the Ni resinate was added, and in the sample of Sample No. 12, to which the Cu resinate was added, cracks were formed as in the sample of Sample No. 1, to which no sintering retardant was added. It is conceivable that while both samples produced the effect of inhibiting sintering of Ag, sintering shrinkage of Ag started before the glass frit began to melt, failing to inhibit the formation of cracks in the black ceramic layer.

The above experimental results indicate the following:

The conductive paste according to aspects of the present invention contains a predetermined amount of silicon resinate as a sintering retardant. The silicon component is adsorbed onto Ag particles and inhibits sintering of the Ag particles. The adsorbed silicon component produces silicon oxide as firing progresses. Further, as the firing progresses, the glass frit contained in the conductive paste melts and flows, and the silicon oxide is dissolved in the melt, whereby sintering of the Ag particles progresses. It thus becomes possible to delay the timing of sintering of the Ag particles.

Thus, due to the retardation of sintering of the Ag particles, the glass frit can sufficiently flow to the underlying black ceramic layer and increase the strength of binding to the black ceramic layer before the Ag particles sinter and shrink. This enables the black ceramic layer to withstand the stress caused by sintering shrinkage of the Ag particles, thereby inhibiting the formation of cracks in the black ceramic layer.

Though the conductive paste of the present invention contains a predetermined amount of silicon resinate as a sintering retardant, once the silicon oxide produced is dissolved in the glass frit, sintering of the Ag particles is not inhibited any more. With the progress of sintering, the density of the conductive film formed from the conductive paste increases; accordingly, the resistivity of the conductive film can be sufficiently reduced.

REFERENCE SIGNS LIST

10 anti-fogging glass
12 glass substrate
14 ceramic layer
20 conductive film
30*a*, 30*b* busbar electrode

The invention claimed is:

1. A window glass article equipped with anti-fogging hot wires and/or an antenna pattern for a vehicle, the window glass article comprising:
   a glass substrate;
   a ceramic layer on a surface of the glass substrate; and
   a conductor circuit including a conductive film on a surface of the ceramic layer,
   wherein the conductive film is formed into the anti-fogging hot wires and/or an antenna pattern, and is a product of a conductive paste comprising:
   a conductive powder;
   a glass frit;
   an organic vehicle; and
   a silicon resinate sintering retardant,
   wherein a content of the silicon resinate sintering retardant is 0.005 wt % to 0.1 wt % in terms of metal based on 100 wt % of the conductive powder.

2. The window glass article according to claim 1, wherein the glass frit in the conductive paste has a softening point of 350° C. to 600° C.

3. The window glass article according to claim 1, wherein the conductive powder in the conductive paste is selected from Ag, a Ag alloy, Pd, a silver-palladium alloy, Cu, or a Cu alloy.

4. The window glass article according to claim 1, wherein an amount of the conductive powder in the conductive paste is 50 wt % to 95 wt %.

5. The window glass article according to claim 1, wherein an average particle size $D_{50}$ of the conductive powder in the conductive paste is 0.05 µm to 10 µm.

6. The window glass article according to claim 1, wherein the glass frit in the conductive paste contains B or Bi.

7. The window glass article according to claim 1, wherein an average particle size $D_{50}$ of the glass frit in the conductive paste is 0.1 µm to 5.0 µm.

8. The window glass article according to claim 1, wherein the organic vehicle in the conductive paste has a volume ratio between a binder resin and an organic solvent of 1-3:7-9.

* * * * *